(No Model.)
R. B. ADAMS.
TETHER.
No. 374,646. Patented Dec. 13, 1887.
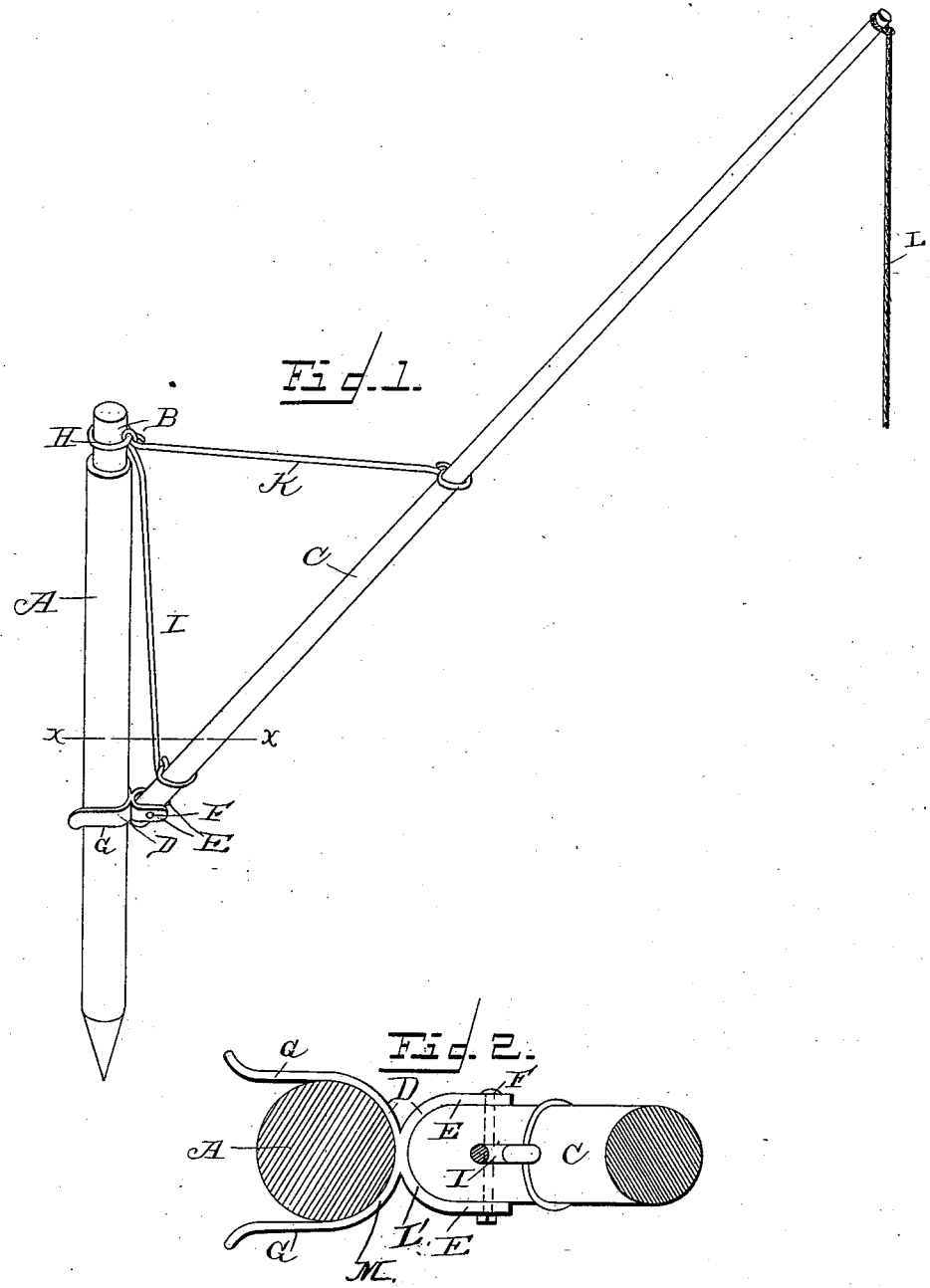

UNITED STATES PATENT OFFICE.

ROBERT BONNER ADAMS, OF HATCHECHUBBEE, ALABAMA.

TETHER.

SPECIFICATION forming part of Letters Patent No. 374,646, dated December 13, 1887.

Application filed September 22, 1887. Serial No. 250,442. (No model.)

*To all whom it may concern:*

Be it known that I, ROBERT BONNER ADAMS, a citizen of the United States, residing at Hatchechubbee, in the county of Russell and State of Alabama, have invented a new and useful Improvement in Tethers, of which the following is a specification.

My invention relates to an improvement in tethers; and it consists in the peculiar construction and combination of devices, that will be more fully set forth hereinafter, and particularly pointed out in the claim.

In the drawings, Figure 1 is a perspective view of a tether embodying my improvements. Fig. 2 is a sectional view of the same, taken on the line *x x* of Fig. 1.

A represents a stake of suitable length, which is driven into the ground and has its upper extremity reduced to form a stud, B.

C represents a sweep-pole, to the inner end of which is secured a yoke or casting, D. The said yoke consists of the U-shaped portion L', having the arms E, which pass on opposite sides of the sweep-pole at the inner end of the same and bear thereagainst. A bolt, F, is inserted transversely through the sweep-pole and the ends of the said arms, thereby pivotally securing them to the sweep. The remaining portion, M, of the casting D is also U-shaped and has a common center with the U-shaped portion L'. The arms G pass on opposite sides of the stake A and are free to move thereon. The transverse portion of the casting, it will be seen, bears squarely against the side of the stake, so that no sharp edges or corners will be presented which would be liable to cut grooves around the stake and cause uneven wear of the same when turning around the same. The pivotal attachment of the yoke or casting, also, is very advantageous, as no matter what angle of inclination may be given the sweep the yoke is permitted to bear squarely against the stake.

H represents a collar which is made of metal, is fitted on the stud B, and is free to rotate thereon. To the said collar is attached a vertical rod, I, which extends downward on one side of the stake and has its lower end attached to the inner end of the sweep-pole, so as to support the inner end thereof and prevent the same from slipping up or down upon the stake.

K represents a similar rod, which is also attached to the collar H and has its lower end attached to the sweep-pole at a suitable distance from the inner end thereof, the function of the said rod K being to support the sweep-pole at a suitable angle.

From the foregoing description it will be understood that the sweep-pole is pivotally connected to the vertical stake and is adapted to swing around the same, and thereby enable the animal which is attached to the outer end of the sweep-pole by a rope, strap, or chain, L, of suitable length to move in a circle while grazing.

Having thus described my invention, I claim—

The improved tether herein described and shown, comprising the stake A, having a stud, B, at its upper end, the collar H, fitted loosely on said stud, the sweep C, the rod K, secured to the collar and extending laterally therefrom to the sweep, the rod I, depending from the collar H and secured to the sweep near its lower end, and the yoke D, comprising the U-shaped portions L' M, having a common center, the arms E of the portion L' being pivotally secured to and fitting around the end of the sweep and the arms G of the portion M passing on the sides of and bearing squarely against the stake, substantially as specified.

In testimony that I claim the foregoing as my own I have hereto affixed my signature in presence of two witnesses.

ROBERT BONNER ADAMS.

Witnesses:
D. C. CROOK,
JOHN V. SMITH.